United States Patent

[11] 3,563,565

[72] Inventor  Roberto Perlini
                Viale dell'Industria, San Bonifacio, Verona, Italy
[21] Appl. No. 738,013
[22] Filed      June 18, 1968
[45] Patented   Feb. 16, 1971
[32] Priority   July 3, 1967
[33]            Italy
[31]            61248/67

[54] TELESCOPE SUSPENSION FOR INDEPENDENT WHEELS OF VEHICLES
     8 Claims, 1 Drawing Fig.

[52] U.S. Cl. .................................................. 280/96.2;
                                                              267/65
[51] Int. Cl. ........................................... B60g 11/28,
                                                              B60g 3/00
[50] Field of Search ........................................ 280/96.2,
                                              124(F); 267/64, 65

[56]                    References Cited
                   UNITED STATES PATENTS
2,241,193   5/1941   Garnett et al. ................   280/96.2
2,914,337  11/1959   Kress ...........................   280/96.2
3,156,481  11/1964   Dangauther ..............   280/96.2X Primary Examiner—A. Harry Levy
Attorney—Jecies and Greenside ABSTRACT: A telescope suspension for individual wheels, preferably of motor vehicles, comprising a telescopically movable unit inserted between a wheel and the frame of the vehicle. A load-carrying resilient supporting element is arranged outside the telescopically movable unit to avoid the use of gaskets and possible leaks resulting therefrom. The telescopically movable unit includes an inner and an outer cylinder movable relative to each other and a hydraulic fluid expansion chamber interposed between said cylinders and communicating through a valve with a reserve fluid chamber to cushion the movements of said cylinders and thereby those of the supported wheel with respect to the frame of the vehicle.

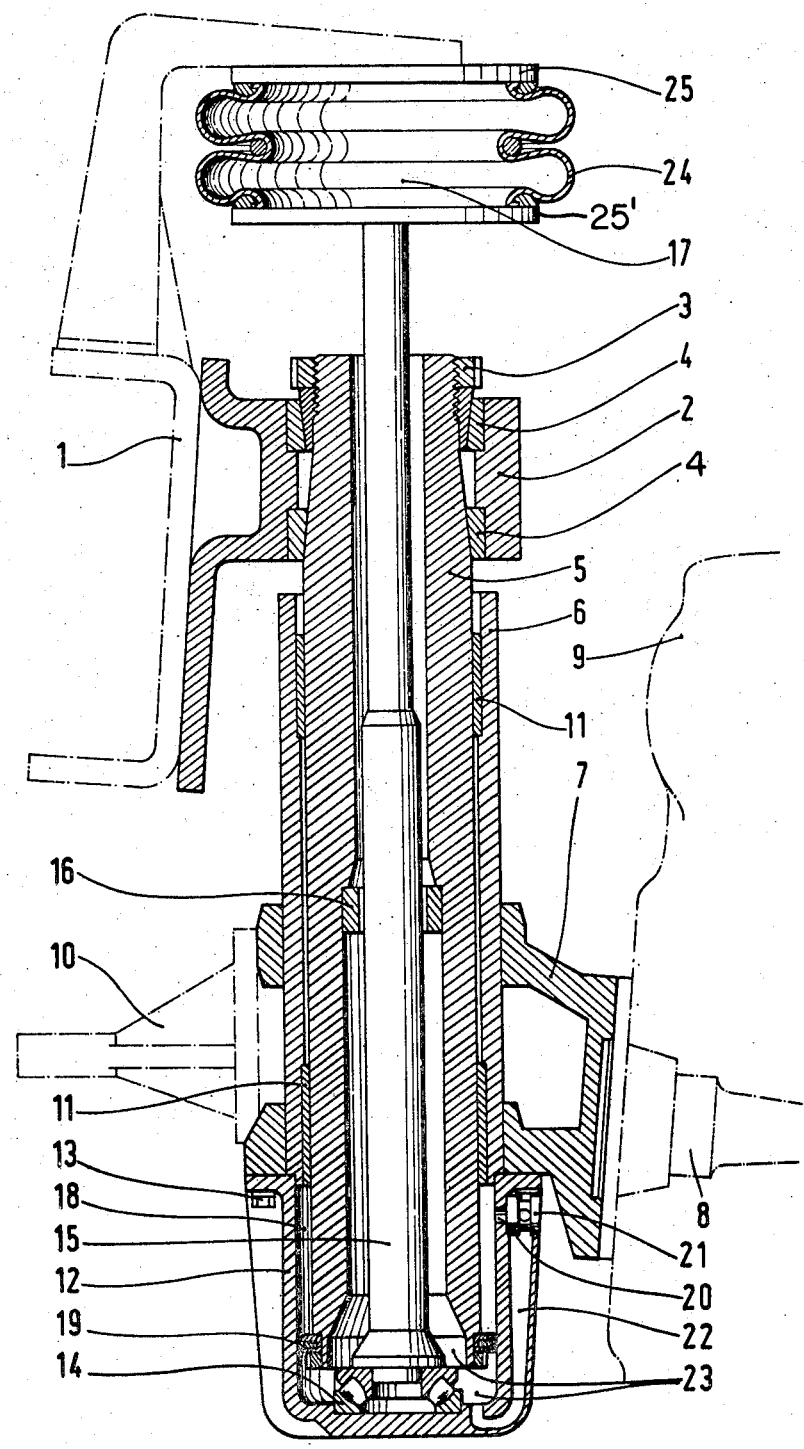

3,563,565

TELESCOPE SUSPENSION FOR INDEPENDENT WHEELS OF VEHICLES

The present invention relates to a telescope suspension for independent wheels of vehicles.

The conventional suspensions for independent wheels of vehicles, such as helical springs, are of late being replaced by hydraulic or pneumatic suspensions which afford some advantages over the conventional suspensions.

The use of this type of suspensions, however, involves some difficulties with respect to their application, one of which is the design of the connection between the wheel and the frame of the vehicle. Another difficulty consists in the design of the connection between the movable wheel and the frame and, in the single unit, the efficiency of the sealing means of the elastic element (oil-air-rubber), which determines the practical use of the suspension itself.

In some cylindrical suspensions, for example, in which the elastic element (air and oil) is contained in the interior of the articulation system, the efficiency of the suspension is determined by the functional efficiency of the sealing elements such as gaskets, stuffing boxes, etc., which are subjected to the action of the suspended weight as well as the wear caused by the movement of the suspension.

It is the object of the present invention to eliminate these inconveniences and this object is achieved according to the invention by providing a telescope suspension for independent wheels of vehicles, wherein the elastic-supporting element of the suspension is arranged outside the mechanical unit forming the articulation of the independent wheel.

The articulation unit may be formed of a cylindrical element secured to the frame and a tubular cylindrical element located outwardly of said first mentioned cylindrical element and connected to the wheel of the vehicle and adapted to carry out a rotating and translating movement.

This mechanical unit, which serves for anchoring the wheel to the frame, is thus constructed without using sealing elements, which are the main cause of the drawbacks in the known suspensions, and is no longer subjected to the action of the suspended load which is fully supported by the elastic-supporting element arranged outwardly.

Arranged within the articulation unit is a shock absorber comprising a cylindrical annular chamber containing oil and provided with conduits for circulation of the oil in a closed circuit.

A preferred embodiment of the invention will now be described with reference to the accompanying drawing in which the only FIGURE is a vertical axial section through a suspension according to the invention.

As shown in the drawing, a frame 1 of a vehicle has rigidly secured thereto a load-bearing support 2. A cylindrical element 5 forming the fixed portion of the telescope unit is secured to the support 2 by means of a threaded ring 3 and conical mounting bushes 4. A tubular cylindrical element 6 is mounted outwardly of the cylindrical element 5 and is rotatable and axially shiftable relative to the latter.

A bracket 7 is fixed on the tubular cylindrical element 6 and carries an axle 8 of a wheel 9. The tubular cylindrical element 6 is controlled by a lever 10 connected to the steering system of the vehicle.

The fixed cylindrical element 5 and the tubular cylindrical element 6 are coupled with the interposition of antifriction bushes 11 which permit the relative axial movement of the elements 5 and 6. The tubular element 6 is downwardly provided with a cap 12 secured by means of screw bolts 13 to the bracket 7. The interior of the cap 12 accommodates on its bottom a thrust bearing 14 receiving the load of a vertical shaft 15.

The shaft 15 is guided in the interior of the element 5 by means of guide bushes 16 to permit vertical reciprocating movement of the shaft and transmit the supporting pressure exerted by the wheel of the vehicle to an elastic element 17 which constitutes the suspension element proper, arranged outside the articulation unit as previously described.

An annular cylindrical chamber 18 is provided between the fixed cylindrical element 5 and the lower cap 12 and is delimited at its lower end by an elastic-sealing ring 19. Oil is introduced into the chamber 18 to serve as cushioning means when due to the axial movements of the cap 12 the capacity of the annular chamber undergoes variations. The oil contained in the chamber 18 can discharge through a hole 20 in a valve 21 and through a conduit 22 can flow into a chamber 23 between the fixed element 5 and the shaft 15. The elastic element 17 constituting the suspension proper is provided with an elastic rubber membrane 24 containing pressurized air. The upper plate 25 of the suspension 17 is rigidly connected to the frame 1 of the vehicle while the lower plate 25' of the suspension is connected to the upper end of the shaft 15.

The invention may be embodied in other specific forms without departing from the spirit or essential characteristics thereof. The present embodiment is therefore to be considered in all respects as illustrative and not restrictive.

I claim:

1. A telescopic suspension for a wheel of a vehicle and comprising spaced apart inner and outer elongated coaxially disposed tubular members, one of which is axially movable relative to the other and adapted for connection to an axle of a wheel, the other of said members being adapted for connection to the vehicle frame, said outer member forming with said inner member adjacent one end portion thereof, at least in part, a pressure chamber; an elongated movable shaft extending within said inner of said tubular members, spaced from said pressure chamber, for operative connection at one end thereof with said one of said tubular members at that end thereof nearest said pressure chamber; and an elastic-supporting element in axial alignment with said tubular members and spaced outwardly therefrom at that end thereof opposite the chamber end, said element having one side thereof adapted for connection to said frame and an opposite side to an end of the shaft opposite said one end thereof, said one of said tubular members comprising the outer tubular member and the other of said members comprising the inner tubular member, said outer tubular member being formed of a first open ended tubular section having its opposite ends terminating axially inwardly of the opposite ends of said inner member and a second tubular section having a closed and an open end, the second section at its open end being connected to form an extension of the first section and having an inner annular wall extending along the outer wall of the inner tubular member to define therewith together with a sealing ring said pressure chamber.

2. A suspension according to claim 1, wherein said closed end of said second section carries a thrust bearing positioned to receive the load from said one end of said shaft.

3. A telescopic suspension according to claim 1, wherein the elastic-supporting element is formed of a plurality of elastic elements.

4. A telescopic suspension according to claim 1, wherein said outer tubular member is mounted for both axially reciprocating and rotary movement relative to the inner member.

5. A suspension according to claim 1, wherein said shaft is imperforate and is spaced from said chamber by fluid passage and valve means.

6. A suspension according to claim 5, wherein said fluid passage means is formed in said second section of said outer tubular member.

7. A telescopic suspension according to claim 5, wherein said shaft is cylindrical and the inner tubular member is cylindrical and having an inner wall outwardly spaced from said shaft to define a second chamber which communicates with said first-named chamber through said valve and passage means in said second section of said outer tubular member.

8. A telescopic suspension for a wheel of a vehicle and comprising spaced apart inner and outer elongated coaxially disposed tubular members, one of which is axially movable relative to the other and adapted for connection to an axle of a wheel, the other of said members being adapted for connection to the vehicle frame, said outer member forming with said inner member adjacent one end portion thereof, at least in part, a pressure chamber; an elongated movable shaft extending within said inner of said tubular members, spaced from said pressure chamber, for operative connection at one end thereof with said one of said tubular members at that end thereof nearest said pressure chamber; and an elastic-supporting element in axial alignment with said tubular members and spaced outwardly therefrom at that end thereof opposite the chamber end, said element having one side thereof adapted for connection to said frame and an opposite side to an end of the shaft opposite said one end thereof, the load-carrying elastic supporting element being formed of an elastic rubber membrane adapted to contain pressurized air and connected at said opposite side thereof by a first disc to that end of said shaft opposite said one end thereof and at said one side thereof by a second disc to the frame of the vehicle.